United States Patent Office 2,922,815
Patented Jan. 26, 1960

2,922,815
CONCENTRATION OF AQUEOUS ACRYLIC ACID

Gerhard Faerber, Rheinberg, Rhineland, Germany, assignor to Deutsche Solvay-Werke G.m.b.H., Solingen-Ohligs, Germany No Drawing. Application March 7, 1957
Serial No. 644,437

Claims priority, application Germany March 22, 1956

3 Claims. (Cl. 260—526)

This invention relates to the concentration of aqueous acrylic acid.

According to the methods mainly used to prepare acrylic acid, the latter occurs in the form of an aqueous solution, as for example, when acetylene is introduced, according to the method of Reppe, into an aqueous alcoholic solution, with the addition of acid and nickel carbonyl, or acrylic acid is prepared from ethylene cyanhydrin or acrylic nitrile. For many intended uses, however, concentrated acrylic acid is necessary. Thus acrylic acid chloride and acrylic acid anhydride can be prepared only from concentrated solutions and acrylic ester may also be prepared economically only from concentrated acrylic acid. The preparation of concentrated acrylic acid from its aqueous solution in which it is usually present in the form of an azeotropic mixture, with water containing 35–40% acrylic acid, is, however, very difficult. With customary drying agents such as calcium chloride, sodium sulphate and the like, the concentration can be increased to 50–60%. In the case of dry metal salts, by shaking the aqueous acrylic acid with dry pulverised nickel chloride or nickel bromide, for example, concentrations of up to 80% can be achieved. It is not possible to obtain higher concentrations in this manner. In German Patent 872,042, Example 2, Reppe has proposed to extract acrylic acid with ether. A concentrated acrylic acid is obtained, but only in a low yield, since the extracted acrylic acid draws water with it and this water cannot be removed by drying agents. Then, in the distillation, it is separated together with the first fraction so that, apart from preponderantly aqueous acrylic acid, only a small part of concentrated acrylic acid is obtained. In addition, etherical acrylic acid solution, according to the invention of Reppe, strongly inclines to polymerisation which also cannot be prevented if ethylene dichloride is used instead of ether. In order to achieve more highly concentrated acrylic acid, it is proposed in German Patent 863,050 to treat aqueous acrylic acid with ammonium sulphate and sulphuric acid. It is stated thus to be possible to prepare an 84–93% acrylic acid. According to French Patent 976,043, acrylic acid is extracted from its aqueous solution by a benzene and ethyl acetate mixture, whereby 95% acrylic acid are disclosed to be obtained. Thus it is not possible to obtain water-free acrylic acid by this process.

According to the process of U.S. patent application Serial No. 509,425 concentrated acrylic acid is prepared in one operation in such a manner that acetylene, nickel carbonyl and carbon monoxide are reacted in the presence of an acid which is stronger than acrylic acid and also in the presence of such quantities of water and solvent, e.g. a ketone, that a part of the water absorbs the nickel salt which forms during the reaction as a highly concentrated solution and the remainder of the water forms—as a layer on the nickel salt solution—a solution of acrylic acid in water and ketone, and that the azeotrope of ketone and water, and finally anhydrous acrylic acid, are distilled off. In the process of application Serial No. 509,425 use is made of the property of ketones of dissolving acrylic acid, of being partially soluble in water and forming with water an azeotropic mixture having a boiling point under 140° C. and not mixing with a concentrated nickel salt solution.

According to the process of application Serial No. 509,425 the mixture of solvent and water collected during the distillation can be recycled continuously and the nickel salt solution also drawn off continuously from the reaction mixture.

It has now been found that aqueous acrylic acid, for example, such an acid as is present in a concentration of 35–40% corresponding to its azeotrope with water, may be concentrated with high yield if it is dissolved in a ketone and the solution shaken with a nickel, cobalt or copper salt, the quantities of water, acrylic acid, ketone and salt being such that a concentrated aqueous solution of the metal salt, for example nickel chloride, is formed, which contains substantially no acrylic acid, and on which a substantially metal salt-free solution of acrylic acid in water and ketone is formed as a layer, the water contained in this layer is removed by distillation of the water-ketone-azeotrope and then the remaining concentrated acrylic acid distilled off.

As solvents, ketones such as methyl ethyl ketone, methylpropyl ketone, methylisopropyl ketone, diethyl ketone, ethylisopropyl ketone, and diisopropyl ketone are particularly suitable.

The shaking of the solution with one of the stated metal salts, preferably nickel chloride and nickel bromide, is effected advantageously at a slightly increased temperature. This should be about 40° C.; it is limited by the tendency of acrylic acid to polymerise, that is to say, it is not advisable to exceed a temperature of approximately 70° C.

It is of the greatest advantage that the metal salts used according to the method of the present invention, should have a polymerisation-preventing action, so that at least in the first part of the reaction, the polymerisation of acrylic acid is prevented. The subsequent azeotropic distillation is preferably carried out with the addition of polymerisation preventors such as the inhibitor hydroquinone.

The reactants necessary for the method of the present invention may easily be treated and re-used, by evaporation of the metal salt solution, for example, and subsequent drying and by dehydration of the water-containing ketone, according to known methods. Acrylic acid collected during the distillation is practically anhydrous. It can easily be purified by a simple distillation. This is a further advantage, for concentrated acrylic acid, as obtained according to the present method, is more stable than its dilute solutions (Ullmanns Encyklopedie der techn. Chemie, 3d vol., 1953, by Dr. W. Foerst, Verlag Urban & Schwarzenberg, Munich-Berlin, page 75, line 14 from the bottom), as obtained according to known methods.

Acrylic acid has numerous uses and for this reason it is marketed. It is, inter alia, the basic substance for acrylic nitrile and the acrylic acid esters and consequently it serves as starting material for synthetic substances and synthetic fibres.

Example 1

90 g. of a 39% aqueous acrylic acid solution are dissolved in 181 g. methylethyl ketone and 43.5 g. dry, pulverised nickel chloride added. The mixture is heated to 50° C. and shaken from time to time. Two layers are formed. If all the nickel chloride in the lower layer is dissolved, the layers can be separated. The upper layer which contains acrylic acid, water and methylethyl ketone, is fractionated by way of a Vigreux column of 0.50 m. length at 15 mm. pressure. At a boiling point of 25–27° C., the azeotrope mixture, consisting of methyl-ethyl ketone and water, is collected. The remaining residue is distilled using a Claisen attachment. After a first fraction of 3 g., 26 g. of an approximately 99% acrylic acid are obtained at a pressure of 15 mm. between 43° and 45° C. The yield of concentrated acid amounts to 72%.

*Example 2*

The mixture of aqueous acrylic acid and methyl ethyl ketone, given in Example 1, is mixed with 74 g. of dry and pulverised nickel bromide and the solution kept for three hours at 50° C. and shaken up from time to time. Two layers are produced, a lower of 118 g. and an upper of 215 g. The lower contains nickel bromide, water and no acrylic acid. The upper layer which contains acrylic acid, water and methyl ethyl ketone, is subjected to a vacuum fractionation by means of a 0.70 m. high Vigreux column. 178 g. of the azeotropic mixture are obtained. Then the Vigreux attachment is removed and the residue transferred to a smaller retort and distilled in vacuo. After a first fraction of 3 g., 25 g. of an approximately 99% acrylic acid are obtained. The yield amounts to 71%. The concentration of acrylic acid was established by acid number and melting point.

From Example 2 it can be calculated that nickel bromide is added in an amount necessary to form at the temperature employed with the water of the lower layer, and with at least 80% of all the water present (the water present in the aqueous acrylic acid), a saturated solution. The ketone, according to Example 2, is added in at least an amount that is needed to be distilled off azeotropically together with 20% of the water present in the aqueous acrylic acid.

What I claim is:

1. Process for the concentration of aqueous acrylic acid, comprising dissolving the aqueous acrylic acid in a lower aliphatic ketone, adding to the solution thus obtained a salt selected from the group of nickel chloride, nickel bromide, and a mixture thereof, shaking said solution with the added nickel salt at a temperature of 40° to 70° C., said salt being used in an amount necessary to form, at the temperature employed, with at least 80% of the water present in the aqueous acrylic acid a saturated solution, the ketone being used in at least such an amount as is required for the amount of water present in addition to the amount of water making up the nickel salt solution to be distilled off azeotropically, thus causing by the addition of said metal salt and ketone two layers to form, a highly concentrated aqueous metal solution, substantially free of acrylic acid, forming the lower layer of said two layers, a solution of acrylic acid, water, and the ketone forming the upper layer, the amount of water in the upper layer not exceeding the water content of the azeotropic mixture of water and the ketone at atmospheric pressure, separating the layers, and fractionating the upper layer to first remove the water-ketone-azeotrope and then the concentrated acrylic acid.

2. A process as claimed in claim 1, wherein the ketone is selected from the group consisting of methyl-ethyl ketone, methyl-propyl ketone, methyl-isopropyl ketone, diethyl ketone, ethyl-isopropyl ketone, and diisopropyl ketone.

3. A process as claimed in claim 1, in which an inhibitor is used as polymerisation preventer.

References Cited in the file of this patent

UNITED STATES PATENTS 2,613,222    Specht et al. _____ Oct. 7, 1952